United States Patent
Sung et al.

(10) Patent No.: US 8,970,271 B2
(45) Date of Patent: Mar. 3, 2015

(54) SIGNAL COUPLING CIRCUIT AND ASSOCIATED METHOD

(71) Applicant: MStar Semiconductor, Inc., Hsinchu Hsien (TW)

(72) Inventors: Chao-Chun Sung, Zhubei (TW); Chao-Ping Huang, Zhubei (TW); Chien-Hung Chen, ChuPei (TW); Chu-Wei Hsia, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/138,211

(22) Filed: Dec. 23, 2013

(65) Prior Publication Data

US 2014/0176211 A1     Jun. 26, 2014

(30) Foreign Application Priority Data

Dec. 21, 2012 (TW) .............................. 101149016 A

(51) Int. Cl.
    *H04N 5/08*     (2006.01)
    *H04N 5/18*     (2006.01)

(52) U.S. Cl.
    CPC ... *H04N 5/08* (2013.01); *H04N 5/18* (2013.01)
    USPC ............................ 327/175; 327/172; 327/309

(58) Field of Classification Search
    CPC ......... H03K 7/08; H03K 4/501; H03K 3/017; H03K 4/502
    USPC ......... 327/175, 56, 72, 77, 78, 172, 173, 174, 327/180, 182, 309, 311, 318, 319, 327, 333
    See application file for complete search history.

(56) References Cited

U.S. PATENT DOCUMENTS 7,268,639 B2 *    9/2007    Matsushita .................. 332/109

* cited by examiner

*Primary Examiner* — Jung Kim
(74) *Attorney, Agent, or Firm* — Edell, Shapiro & Finnan, LLC

(57) ABSTRACT

A signal coupling circuit for generating an output signal according to an input signal is provided. The signal coupling circuit includes: a coupling capacitor, configured to generate a coupling signal according to the input signal; a clock generating circuit, configured to generate a clock and determine a duty cycle of the clock by the coupling capacitor; a discharge circuit, configured to intermittently discharge the coupling capacitor according to the duty cycle of the clock; and an output circuit, coupled to the coupling capacitor, for generating the output signal according to the coupling signal.

18 Claims, 4 Drawing Sheets

SIGNAL COUPLING CIRCUIT AND ASSOCIATED METHOD

This application claims the benefit of Taiwan application Serial No. 101149016, filed Dec. 21, 2012, the subject matter of which is incorporated herein by reference.

BACKGROUND OF THE INVENTION

1. Field of the Invention

The invention relates in general to a coupling circuit and associated method, and more particularly, to coupling circuit and associated method for an integrated circuit.

2. Description of the Related Art

In a signal transmission system, a transmission signal from a transmission end may include an alternating-current (AC) component and a direct-current (DC) component. As the DC component may get lost or drift during the transmission, a reception end cannot determine a DC reference level based on the DC component in the reception signal. Therefore, before the reception end of the signal transmission system processes the reception signal, the reception signal is AC coupled by an external capacitor to remove the DC component from the reception signal. The reception end then reconstructs the DC component in the reception signal according to a predetermined level for subsequent processes, or directly processes the reception signal without reconstructing the DC component in the reception signal.

The removal and reconstruction of the DC component is applied to various transmission systems. An image signal transmission system is taken as an example for further illustrations. FIG. 1 shows a schematic diagram of a reception end of an image signal transmission system. Referring to FIG. 1, in the image signal transmission system, a synchronization signal is added to an image signal (to be jointly referred to as a composite signal) and transmitted to an image signal reception integrated circuit 100. Before entering the integrated circuit 100, the composite signal is AC coupled with an external capacitor 110 to remove a DC component from the composite signal. A synchronization signal detection circuit 120 in the signal reception integrated circuit 100 then reconstructs a DC level of the composite signal and detects the synchronization signal in the component signal to obtain synchronization information, which is later utilized in subsequent image processes. In general, the synchronization signal detection circuit 120 includes a clamping circuit 130 for limiting the DC level of the composite signal within a range according to a predetermined level, and a comparison circuit 140 for detecting the synchronization signal in the composite signal to obtain the foregoing synchronization information for subsequent image processes. For example, when the synchronization signal is added to a G signal representing the green color in an RGB signal, the G signal is usually referred to as a sync-on-green (SOG) signal; when the synchronization signal is added to a Y signal representing luminance in a YPbPr signal, the Y signal is usually referred to as a sync-on-luminance (SOY) signal. For illustration purposes, an image signal containing a synchronization signal is referred to as a composite signal throughout the specification.

Referring to FIG. 1, the image signal reception integrated circuit 100 includes an analog front-end circuit 150. In addition to the foregoing synchronization signal detection circuit 120, the analog front-end circuit 150 further receives the composite signal via another external capacitor 160 to obtain image information. In current techniques, the integrated circuit 100 receives the composite signal via the two external capacitors 110 and 160 by using different pins, and provides the synchronization information to the synchronization signal detection circuit 120 and the image information to the analog front-end circuit 150. In other words, the synchronization detection circuit 120 obtains the synchronization information by receiving the composite signal via an independent pin. However, if the above independent pin is eliminated, i.e., if the synchronization signal detection circuit 120 directly and internally obtains the synchronization information in the composite signal from the integrated circuit 100, the image signal transmission system may become more cost-effective.

SUMMARY OF THE INVENTION

The invention is directed to a signal coupling circuit and associated method to improve the issues of the prior art.

A signal coupling circuit for generating an output signal according to an input signal is provided by the present invention. According to an embodiment of the present invention, the signal coupling circuit includes: a coupling capacitor, configured to generate a coupling signal according to the input signal; a clock generating circuit, configured to generate a clock and determine a duty cycle of the clock by the coupling capacitor; a discharge circuit, configured to intermittently discharge the coupling capacitor according to the duty cycle of the clock; and an output circuit, coupled to the coupling capacitor, for generating the output signal according to the coupling signal. The discharge circuit includes a switch and a discharge unit. The switch is coupled to the coupling capacitor and the discharge unit, and switches between an on state and an off state according to the duty cycle. The discharge unit discharges the coupling capacitor when the switch switches to the on state, and stops discharging the coupling capacitor when the switch switches to the off state.

According to an embodiment of the present invention, the above signal coupling circuit further includes a level limiting circuit. The level limiting circuit, coupled to the coupling capacitor, limits an extremum value of the coupling signal to a set value according to a reference value, and forms a clamping circuit with the discharge circuit.

According to an embodiment of the present invention, the output circuit of the above signal coupling circuit includes comparison circuit. The comparison circuit, coupled to an output end of the coupling capacitor and the level limiting circuit, compares the coupling signal with a reference level to generate the output signal.

A signal coupling method for generating an output signal according to an input signal and implementable by a signal coupling circuit is provided by the present invention. According to an embodiment of the present invention, the signal coupling method includes: generating a coupling signal by a coupling capacitor according to the input signal; providing a clock, and determining a duty cycle of the clock by the coupling capacitor; intermittently discharging the coupling capacitor according to the duty cycle of the clock; and generating the output signal according to the coupling signal. The step of intermittently discharging the coupling capacitor according to the duty cycle of the clock includes: switching a switch between an on state and an off state according to the duty cycle of the clock, discharging the coupling capacitor when the switch switches to the on state, and stopping discharging the coupling capacitor when the switch switches to the off state.

According to an embodiment of the present invention, the above coupling method further includes limiting an extremum value of the coupling signal to a set value according to a reference value.

According to an embodiment of the present invention, the step of generating the output signal according to the coupling signal in the above coupling method includes comparing the coupling signal with a reference level to generate the output signal.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on general definition in the technical field of the application. If the application describes or explains one or some terms, definition of the terms are based on the description or explanation of the application. In possible implementation, in the application, the relationship between objects or events includes a direct relationship or an indirect relationship. The indirect relationship refers to that there are intermediate objects or space between the objects or there are intermediate events or timing period between the events. Further, shapes, sizes and ratios of the objects are exemplary for one skilled person in the art to understand the application, not to limit the application.

Each of the disclosed embodiments has one or more technical features. However, it does not mean that implementation of the application needs every technical feature of any embodiment of the application or combination of the embodiments of the application is prohibited. In other words, in possible implementation, one skilled person in the art would selectively implement part or all technical features of any embodiment of the application or selectively combine part or all technical features of the embodiments of the application based on the disclosure of the application and his/her own need. Implementation of the application is flexible.

A signal coupling circuit and associated method are disclosed by the present invention. The signal coupling circuit and associated method may perform signal coupling in an integrated circuit to at the same time achieve a substantially same effect of signal coupling using an external capacitor. The signal coupling circuit and associated method are applicable to various signal transmission systems, e.g., an image signal transmission system. The above example is for illustrating the present invention to a person having ordinary skill in the art, not limiting the present invention. In possible implementation of the embodiments, a person having ordinary skill in the art may choose equivalent elements or steps for realizing the present invention according to the details of the disclosure. That is, the embodiments are not limited to the embodiments disclosed in the specification. Further, as a part or all of the elements are individually known elements, without affecting the full disclosure and possible implementation of the signal coupling circuit, details associated with the individual elements for realizing the signal coupling circuit are omitted. The signal coupling method of the present invention may be implemented by the signal coupling circuit of the present invention, or other signal coupling circuits. Similarly, without affecting the full disclosure and possible implementation of the method, details associated with hardware for performing the method are omitted.

Figure 1:
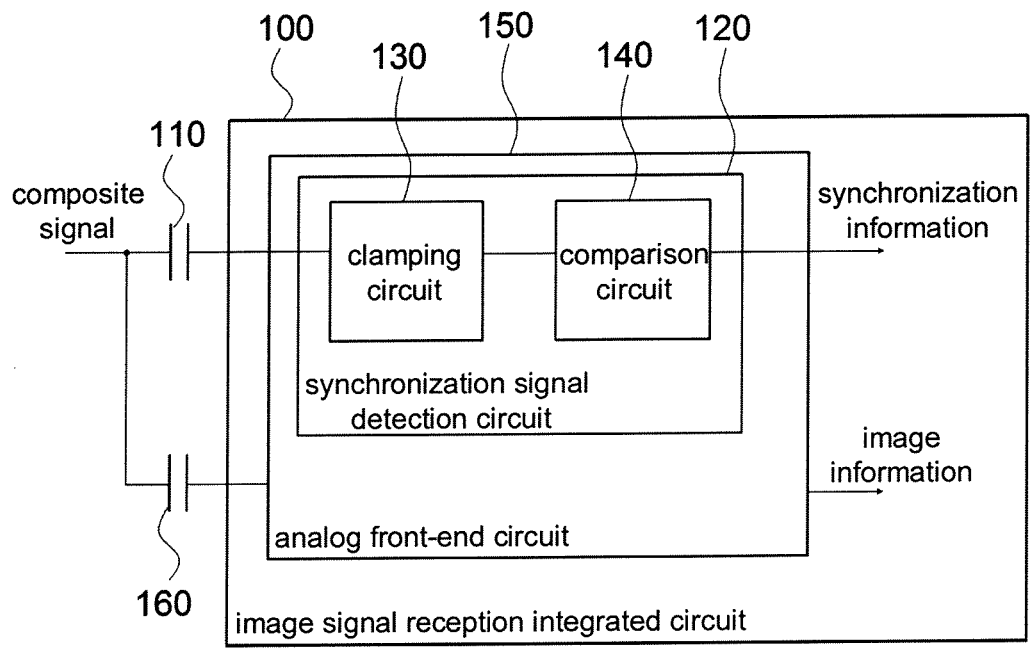
FIG. 1 is a schematic diagram of a reception end in an image signal transmission system.
Figure 2:
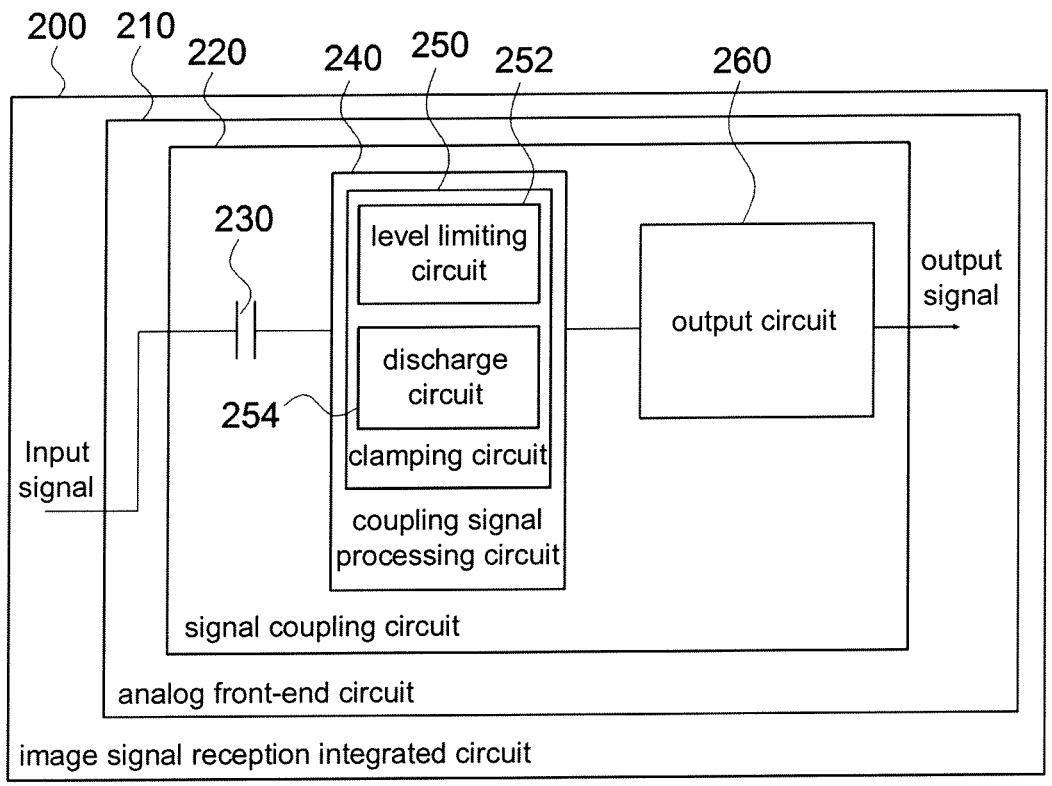
FIG. 2 is a schematic diagram of a signal coupling circuit according to an embodiment of the present invention.

FIG. 2 shows a schematic diagram of a signal coupling circuit according to an embodiment of the present invention. The embodiment may be applied to an image signal reception integration circuit 200. More specifically, the embodiment may be applied to an analog front-end circuit 210 in an image signal reception integrated circuit 200 to perform signal coupling. Referring to FIG. 2, the signal coupling circuit 220 according to the embodiment includes a coupling capacitor 230, a coupling signal processing circuit 240 and an output circuit 260. The coupling capacitor 230 receives an input signal and generates a coupling signal. In the embodiment, the input signal is a composite signal containing a synchronization signal and an image signal. The coupling signal processing circuit 240 generates a processed signal according to the coupling signal. In the embodiment, the coupling signal processing circuit 240 includes a clamping circuit 250, which is for setting a DC level of the coupling signal to generate a clamping signal (i.e., the processed signal). The output circuit 260, coupled to the coupling signal processing circuit 240, generates an output signal according to the processed signal. In the embodiment, the output circuit 260 includes a comparison circuit (not shown) for comparing the processed signal with a reference level to generate the output signal. More specifically, the comparison circuit detects a synchronization signal in the processed signal to generate the output signal representing the synchronization signal.

The clamping circuit 250 typically includes a level limiting circuit 252 and a discharge circuit 254 (e.g., a circuit having a current sink). According to a reference value, the level limiting circuit 252 limits an extremum value of the coupling signal to a set value (e.g., the reference value), so as to facilitate the subsequent process performed by the output circuit 260 on the coupling signal. The discharge circuit 254 continually discharges the coupling capacitor 230 according to a discharge current to gradually lower the level of the coupling signal, so that the level of the coupling signal continually satisfies a predetermined condition. However, to prevent a drastic drop in the level of the coupling signal due to the continual discharge, a capacitance value of the coupling capacitor 230 needs to maintain at a considerable value. Thus, the coupling capacitor 230 may occupy a significant area of the image signal reception integrated circuit 200 and result in increased overall costs.

Figure 3:
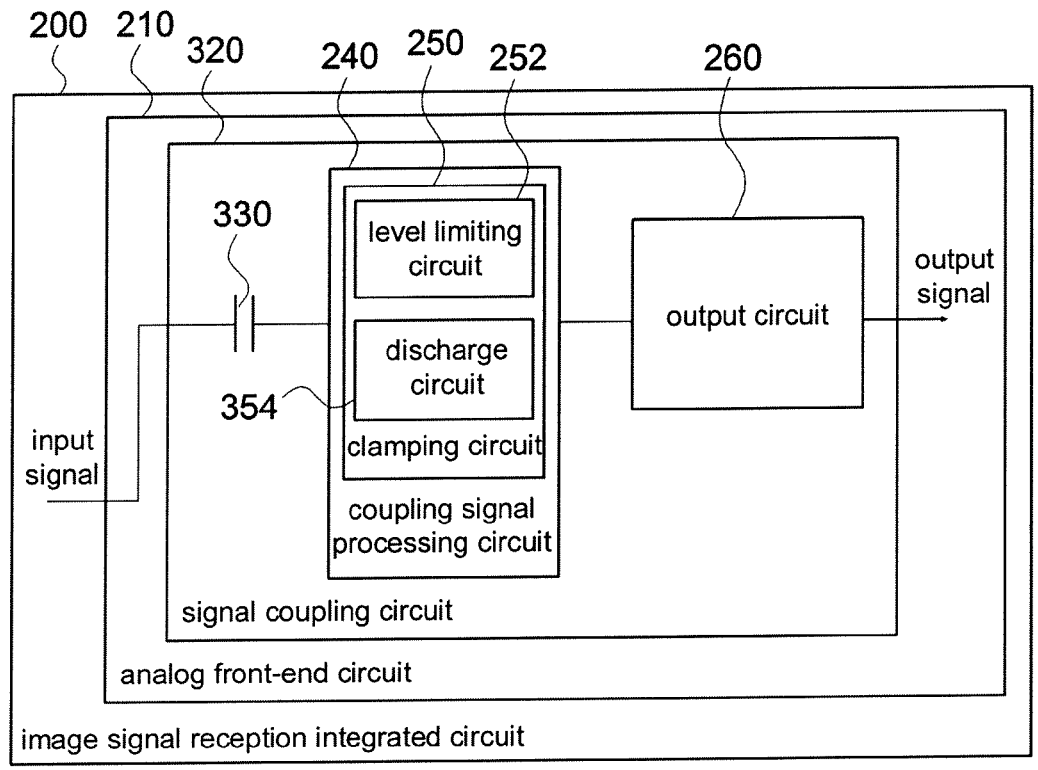
FIG. 3 is a schematic diagram of a signal coupling circuit according to another embodiment of the present invention.

To prevent the coupling capacitor 230 from occupying an excessive area, a signal coupling circuit is provided according to another embodiment of the present invention, as shown in FIG. 3. A main difference of the embodiment in FIG. 3 from the embodiment in FIG. 2 is that, compared to the coupling capacitor 230 in FIG. 2, a coupling capacitor 330 in the embodiment is a small capacitor. For example, the capacitance value of the coupling capacitor 330 is merely $\frac{1}{100}$ of that of the coupling capacitor 230. Further, the discharge current provided by a discharge circuit 354 of the embodiment is a small discharge current compared to the discharge current of the discharge circuit 254 in FIG. 2. For example, when the capacitance value of the coupling capacitor 330 is 1/100 of that of the coupling capacitor 230, the size of the discharge current of the discharge circuit 354 is correspondingly 1/100 of that of the discharge circuit 254. As such, according to the embodiment, excessive consumption on the area of an integrated circuit is prevented while maintaining a substantially same effect. However, not only the value of a minute discharge current is not easily controlled, but also the discharge circuit 354 may in practice occupy a greater area of the integrated circuit in order to generate a minute discharge current. Thus, although the embodiment in FIG. 3 solves the issues of the large capacitor 230 in FIG. 2, issues of the discharge circuit 354 occupying a greater area of the integrated circuit and a discharge current that is not easily controlled are also incurred.

Figure 4:
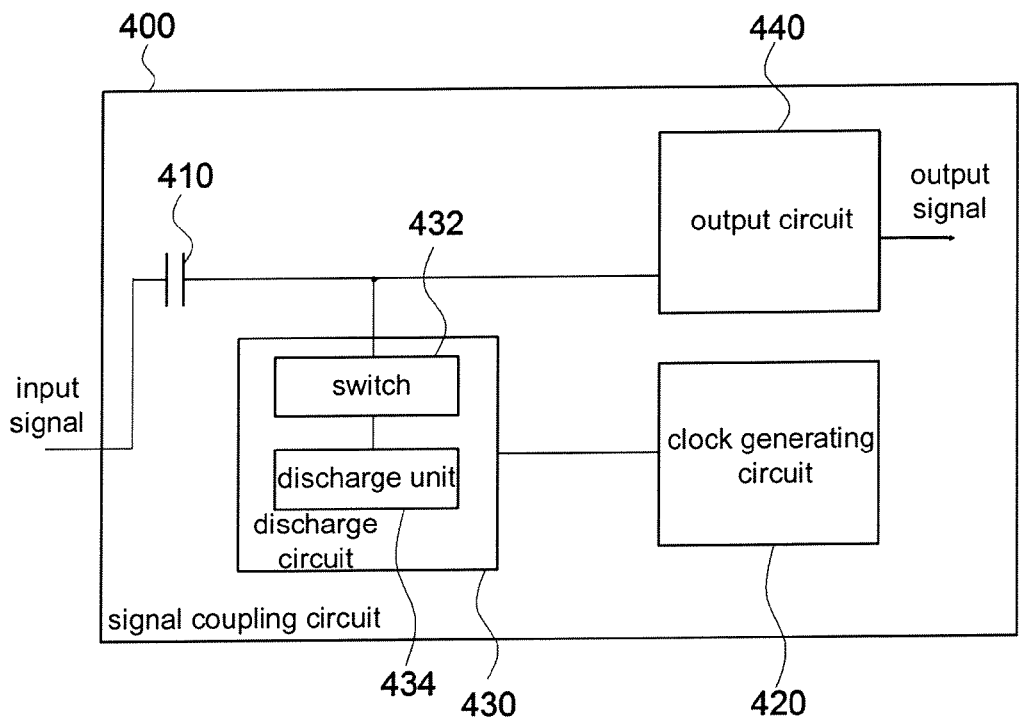
FIG. 4 is a schematic diagram of a signal coupling circuit according to another embodiment of the present invention.

To solve the issues of the embodiments in FIGS. 2 and 3, a signal coupling circuit is further provided according to an embodiment of the present invention. Referring to FIG. 4, the embodiment is applicable to an image signal reception integrated circuit, and more specifically, to an analog front-end circuit in an image signal reception integrated circuit, to perform signal coupling. A signal coupling circuit 400 according to the embodiment includes a coupling capacitor 410, a clock generating circuit 420, a discharge circuit 430, and an output circuit 440. The coupling capacitor 410, configured to receive an input signal to generate a coupling signal, includes an input end and an output end. The input end is coupled to the input signal, and the output end is coupled to the coupling signal. In the embodiment, the capacitance value of the coupling capacitor 410 is smaller than that of the coupling capacitor in FIG. 2. In other words, the coupling capacitor 410 in the embodiment occupies a relatively smaller area on the integrated circuit. The clock generating circuit 420 generates a clock, and determines a duty cycle of the clock according to the capacitance value of the coupling capacitor 410. For example, comparing the embodiment in FIG. 4 with the embodiment in FIG. 2, assuming that the capacitance value of the coupling capacitor 410 in the embodiment is 1/100 of that of the coupling capacitor 230 in FIG. 2, the clock generating circuit 420 correspondingly outputs a clock that is 1/100 of the duty cycle. However, given a speed at which the level of the coupling signal outputted by the coupling capacitor attenuates is within an acceptable attenuation range, the duty cycle of the clock may having a variation range relative to the attenuation range. The discharge circuit 430, coupled to the output end of the coupling capacitor 410 and the clock generating circuit 420, intermittently discharges the coupling capacitor 410 according to the duty cycle of the clock. The discharge circuit 430 includes a switch 432 and a discharge unit 434. The switch 432 has a first end and a second end coupled to the output end of the coupling capacitor 410 and the discharge unit 434, respectively. The switch 432 switches between an on state and an off state according to the duty cycle of the clock. More specifically, when the clock corresponds to a first level (e.g., a high voltage level), the switch 432 switches to the on state; when the clock corresponds to a second level (e.g., a low voltage level), the switch 432 switches to the off state. When the switch 432 switches to the on state, the discharge unit 434 discharges the coupling capacitor 410. In the embodiment, the discharge unit 434 includes a current source (e.g., a current sink) for discharging the coupling capacitor 410 according to a discharge current when the switch 432 switches to the on state. The size of the discharge current may be substantially equivalent to the charge current in FIG. 2. In other words, when the capacitance value of the coupling capacitor 410 is far smaller than that of the coupling capacitor 230, the area occupied by the discharge circuit 430 on the integrated circuit is similar to that occupied by the discharge circuit 254 in FIG. 2. In the embodiment, the output circuit 440 includes a comparison circuit for comparing the coupling signal with a reference level to generate the output signal.

In the above embodiment, the size of the discharge current equal to the size of the discharge current in FIG. 2 is given as an example. In another embodiment, the size of the discharge current may be different, and the duty cycle of the clock may be correspondingly adjusted to achieve the same or similar effect. For example, in a structure shown in FIG. 4, if the size of the discharge current of one embodiment is twice of that of another embodiment, the duty cycle of the clock of the embodiment may be one-half of that of the another embodiment to provide the coupling capacitor 410 the similar or same discharge effect. Similarly, given the attenuation speed of the level of the coupling signal outputted by the coupling capacitor 410 is within an acceptable attenuation range, the duty cycle of the clock may have a variation range relative to the attenuation range.

It should be noted that, the coupling capacitor 410, the clock generating circuit 420, the switch 432, the discharge unit and the output circuit 440 may be individually implemented by known techniques, and details associated with the capacitance value of the coupling capacitor, the duty cycle of the clock and the size or the discharge current are for explaining the present invention to a person having ordinary skill in the art, not limiting the present invention. In other words, according to the disclosure, a person having ordinary skill in the art is capable of realizing the coupling capacitor 410, the clock generator 420, the switch 432, the discharge unit 434 and the output circuit 440 using known elements, and may determine the capacitance value of the coupling capacitor 410, the duty cycle of the clock, the size of the discharge current, and the function and architecture of the output circuit according to design requirements or specifications. Further, given that circuits and parameters match with technical features disclosed by the present invention, modifications and variations of the embodiments of the present invention are encompassed within the scope of the present invention. In addition to the technical features disclosed in the foregoing embodiments, in the present invention, the clock generating circuit 420 may render the duty cycle of the clock to be proportional to the capacitance value of the coupling capacitor 410. The proportional relationship may be directly proportional or inversely proportional, or may be linearly proportional or non-linearly proportional. Further, a ratio of a period of the on state to a period of the off state of the switch may equal to the duty cycle of the clock or be an inverse of the duty cycle of the clock, the clock generating circuit 420 may adjust the duty cycle of the clock within a range according to the capacitance value of the coupling capacitor, and the signal coupling circuit 400 is a part of an integrated circuit.

Figure 5:
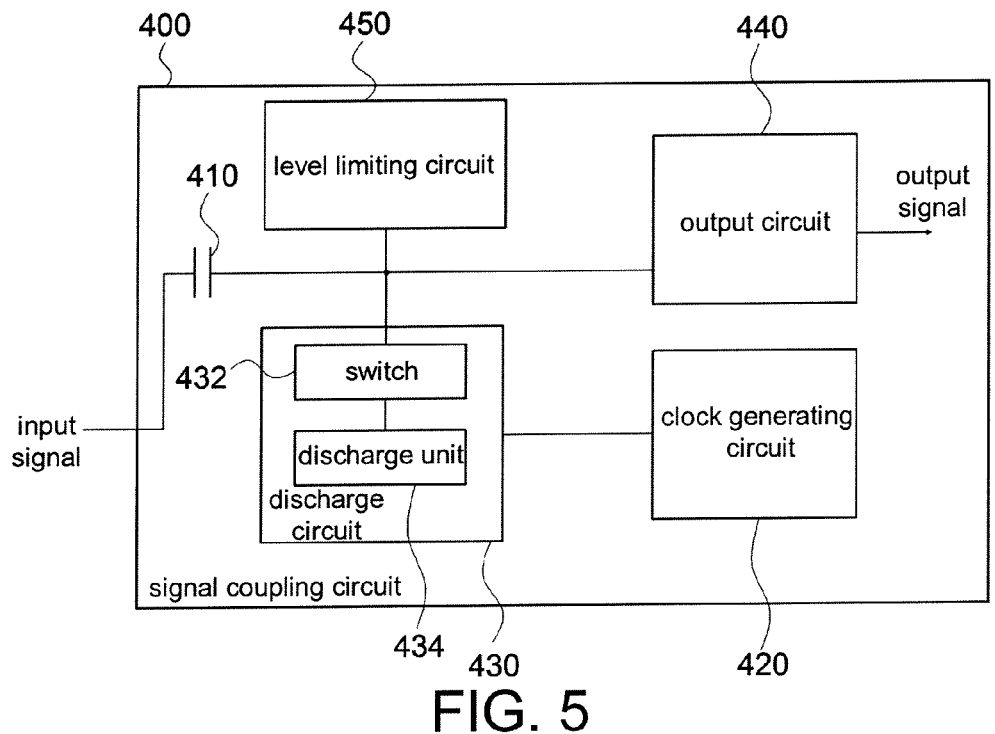
FIG. 5 is a schematic diagram of a signal coupling circuit according to yet another embodiment of the present invention.

FIG. 5 shows a schematic diagram of a signal coupling circuit according to yet another embodiment of the present invention. Compared to the embodiment in FIG. 4, the embodiment in FIG. 5 further includes a level limiting circuit 450. The level limiting circuit 450, coupled to the output end of the coupling capacitor 410 and the output circuit 440, limits an extremum value (e.g., a minimum voltage value) of the coupling signal to a set value (e.g., a reference value) according to a reference value, and forms a clamping circuit with the discharge circuit 430. In the embodiment, the input signal and the coupling signal are a composite signal (e.g., an SOG or SOY signal) containing synchronization information and image information. The output circuit 440 includes a comparison circuit for comparing the coupling signal with a reference level, so as to detect the synchronization information in the coupling signal to generate the output signal having the synchronization information. Except the description above, other details of the embodiment in FIG. 5 are similar to the embodiment in FIG. 4. In other words, the embodiment in FIG. 5 is a variation of the embodiment in FIG. 4, and the same details are omitted herein.

Figure 6:
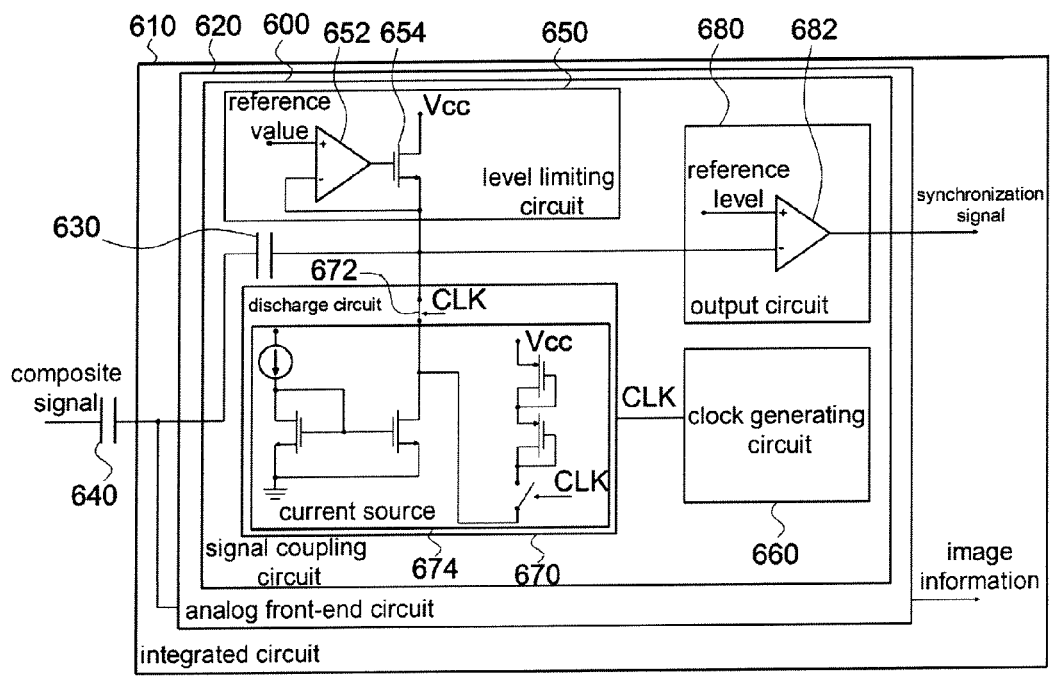
FIG. 6 is an embodiment as a variation of the embodiment in FIG. 5.

FIG. 6 shows an embodiment as a variation from the embodiment in FIG. 5. As shown in FIG. 6, a coupling circuit 600 of the present invention is included in an analog front-end (AFE) circuit 620, and includes a coupling capacitor 630, a level limiting circuit 650, a clock generating circuit 660, a discharge circuit 670 and an output circuit 680. The coupling capacitor 630 receives a composite signal containing synchronization information and image information via an external capacitor 640, and generates a coupling signal according to the composite signal. In the embodiment, the capacitance value of the coupling capacitor 630 is far smaller than that of the external capacitor 640, and does not impose substantial effects on functions of the external capacitor 640. The level limiting circuit 650, coupled to the coupling capacitor 630, includes a comparator and a voltage controlled element 654. The comparator 652 compares the coupling signal with a reference value, and renders the voltage controlled element 654 to be turned on when the coupling signal is smaller than the reference value, so as to charge the coupling capacitor 630 and limit an extremum value (e.g., a minimum voltage value) of the coupling signal to a set value (e.g., the reference value). The clock generating circuit 660 generates a clock, and determines a duty cycle of the clock according to the capacitance of the coupling capacitor 630. The discharge circuit 670 includes a switch 672 and a current source 674. The switch 672 is coupled to the coupling capacitor 630 and the clock generating circuit 660, and switches between an on state and an off state according to the duty cycle of the clock. The current source 674 discharges the coupling capacitor 630 according to a discharge current when the switch 672 switches to the on state, and stops discharging the coupling capacitor 630 when the switch 672 switches to the off state. The output circuit 680 is coupled to the coupling capacitor 630 and the level limiting circuit 650, and includes a comparator 682 for detecting the synchronization information in the coupling signal according to a reference level to generate a synchronization signal corresponding to the synchronization information.

Details described in the embodiment in FIG. 6 are for reference of a person having ordinary skill in the art, not limiting the present invention. Without excessive experiments and unreasonable trials, variations and modifications may be made to the embodiment in FIG. 6 by a person having ordinary skill in the art.

Figure 7:
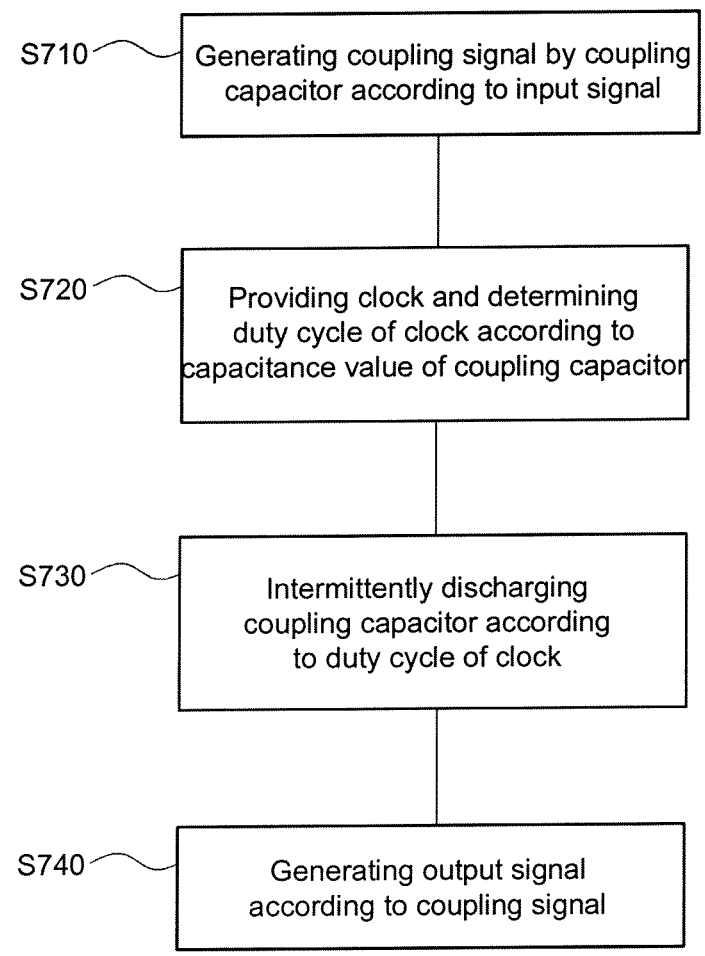
FIG. 7 is a flowchart of a signal coupling method according to an embodiment of the present invention.

The present invention further provides a signal coupling method in addition to the signal coupling circuit disclosed in the above embodiments in FIGS. 2 to 6. The method is for generating an output signal according to an input signal, and may be performed by the abovementioned signal coupling circuit or other signal coupling circuits. FIG. 7 shows a flowchart of a signal coupling method according to an embodiment of the present invention. Referring to FIG. 7, the method includes the following steps.

In step S710, a coupling signal is generated by a coupling capacitor according to the input signal.

In step S720, a clock is provided, and a duty cycle of the clock is determined according to a capacitance value of the coupling capacitor.

In step S730, the coupling capacitor is intermittently discharged according to the duty cycle of the clock. More specifically, step S730 includes: switching a switch between an on state and an off state according to the duty cycle of the clock; and discharging the coupling capacitor via the switch when the switch switches to the on state, and stopping discharging the coupling capacitor when the switch switches to the off state.

In step S740, the output signal is generated according to the coupling signal.

In one embodiment, the signal coupling method further includes: according to a reference value, an extremum value (e.g., a minimum voltage value) of the coupling signal is limited to a set value (e.g., the reference value), so as to facilitate step S740 of generating the output signal according to the coupling signal.

It should be noted that, for a person having ordinary skill in the art, different applications and variations can be easily understood based on description associated with FIGS. 2 to 6. For example, the input signal may be an SOG signal or an SOY signal, the input signal and the coupling signal includes synchronization information and image information, respectively, and step S740 may detect the synchronization information in the coupling signal to generate the output signal representing the synchronization signal. Further, step S720 may render the duty cycle of the clock to be proportional to the capacitance value of the coupling capacitor, and the proportional relationship may be directly proportional or inversely proportional, or may be linearly proportional or non-linearly proportional; and may also adjust the duty cycle of the clock within a range according to the capacitance value of the coupling capacitor. Step S730 may render a ratio of a period of the on state to a period of the off state of the switch may equal to the duty cycle of the clock or to be an inverse of the duty cycle of the clock. Details for a person to thoroughly understand the signal coupling method according to the embodiment can be referred from the foregoing description, and shall be omitted herein.

In conclusion, the signal coupling circuit and associated method are capable of signal coupling in an integrated circuit to eliminate the need of an external capacitor and an independent pin of the prior art, and can determine the duty cycle of a clock according to a capacitance value of a coupling capacitor and/or a size of a discharge current to control the discharge of the coupling capacitor. Thus, not only an equivalent effect of an external capacitor is achieved, but also an excessive area occupied by the coupling capacitor and/or a discharge circuit on an integrated circuit is prevented. In short, the present invention offers preferred cost-effectiveness and application flexibilities compared to the prior art.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal coupling circuit, configured to generate an output signal according to an input signal, comprising:
a coupling capacitor, configured to generate a coupling signal at an output terminal of the coupling capacitor according to the input signal that varies and is provided at an input terminal of the coupling capacitor;
a clock generating circuit, configured to generate a clock, and to determine a duty cycle of the clock by the coupling capacitor;

a discharge circuit, coupled to the coupling capacitor and the clock generating circuit, for intermittently discharging the coupling capacitor according to the duty cycle of the clock, the discharge circuit comprising:
  a switch, coupled to the coupling capacitor, switching between an on state and an off state according to the duty cycle of the clock; and
  a discharge unit, coupled to the switch, discharging the coupling capacitor when the switch switches to the on state and stopping discharging the coupling capacitor when the switch switches to the off state; and
an output circuit, coupled to the coupling capacitor, for generating the output signal according to the coupling signal,
wherein the clock generating circuit adjusts the duty cycle of the clock within a range according to a capacitance value of the coupling capacitor.

2. The signal coupling circuit according to claim 1, further comprising:
  a level limiting circuit, coupled to the coupling capacitor, for limiting an extremum value of the coupling signal to a set value according to a reference value; wherein the discharge circuit and the level limiting circuit form a clamping circuit.

3. The signal coupling circuit according to claim 2, wherein the output circuit comprises:
  a comparison circuit, coupled to the coupling capacitor and the level limiting circuit, for comparing the coupling signal with a reference level to generate the output signal.

4. The signal coupling circuit according to claim 3, wherein the input signal and the coupling signal comprise image information and synchronization information, respectively, and the comparison circuit detects the synchronization information in the coupling signal according to the reference level to generate the output signal.

5. The signal coupling circuit according to claim 3, wherein the input signal is a sync-on-green (SOG) or sync-on-luminance (SOY) signal, and the signal coupling circuit generates the output signal according to synchronization information in the SOG or SOY signal.

6. The signal coupling circuit according to claim 1, wherein the discharge unit is a current sink.

7. The signal coupling circuit according to claim 1, wherein the clock generating circuit renders the duty cycle of the clock to be proportional to a capacitance value of the coupling capacitor.

8. The signal coupling circuit according to claim 7, wherein the clock generating circuit renders the duty cycle of the clock to be linearly proportional to the capacitance value of the coupling capacitor.

9. The signal coupling circuit according to claim 1, wherein a ratio of a period of the on state and a period of the off state of the switch is associated with the duty cycle of the clock or is an inverse of the duty cycle of the clock.

10. The signal coupling circuit according to claim 1, being a part of an integrated circuit.

11. A signal coupling method, for generating an output signal according to an input signal, performed by a signal coupling circuit, comprising:
  generating a coupling signal at an output terminal of a coupling capacitor according to the input signal that varies and is provided at an input terminal of the coupling capacitor;
  providing a clock, and determining a duty cycle of the clock by the coupling capacitor;
  intermittently discharging the coupling capacitor according to the duty cycle of the clock, comprising:
    switching a switch between an on state and an off state according to the duty cycle of the clock; and
    discharging the coupling capacitor via the switch when the switch switches to the on state; and
  generating the output signal according to the coupling signal,
  wherein the step of providing the clock comprises:
    adjusting the duty cycle of the clock within a range according to a capacitance value of the coupling capacitor.

12. The signal coupling method according to claim 11, further comprising:
  limiting an extremum value of the coupling signal to a set value according to a reference value.

13. The signal coupling method according to claim 12, wherein the step of generating the output signal according to the coupling signal comprises:
  comparing the coupling signal with a reference level to generate the output signal.

14. The signal coupling method according to claim 13, wherein the input signal and the coupling signal comprise image information and synchronization information, respectively, and the step of generating the output signal according to the coupling signal comprises detecting the synchronization information in the coupling signal to generate the output signal.

15. The signal coupling method according to claim 13, wherein the input signal is an SOG or SOY signal, and the signal coupling method generates output signal according to synchronization information in the SOG or SOY signal.

16. The signal coupling method according to claim 11, wherein the step of providing the clock comprises:
  rendering the duty cycle of the clock to be proportional to a capacitance value of the coupling capacitor.

17. The signal coupling method according to claim 16, wherein the step of providing the clock comprises:
  rendering the duty cycle of the clock to be linearly proportional to the capacitance value of the coupling capacitor.

18. The signal coupling method according to claim 11, wherein the step of rendering the switch to switch between the on state and the off state according to the duty cycle of the clock comprises:
  rendering a ratio of a period of the on state and a period of the off state of the switch to be associated with the duty cycle of the clock or to be an inverse of the duty cycle of the clock.

* * * * *